(12) United States Patent
Woodfield et al.

(10) Patent No.: US 10,975,709 B1
(45) Date of Patent: Apr. 13, 2021

(54) TURBINE VANE ASSEMBLY WITH CERAMIC MATRIX COMPOSITE COMPONENTS AND SLIDING SUPPORT

(71) Applicant: Rolls-Royce plc, London (GB)

(72) Inventors: Rachel Woodfield, London (GB); Robert S. Bainbridge, London (GB); Afzal Ali, London (GB); Oliver D. A. O'Carroll, London (GB); Michael J. Whittle, London (GB)

(73) Assignee: Rolls-Royce plc

( * ) Notice: Subject to any disclaimer, the term of this patent is extended or adjusted under 35 U.S.C. 154(b) by 17 days.

(21) Appl. No.: 16/679,875

(22) Filed: Nov. 11, 2019

(51) Int. Cl.
*F01D 5/28* (2006.01)
*F01D 9/04* (2006.01)
*F01D 5/18* (2006.01)

(52) U.S. Cl.
CPC ............ *F01D 9/042* (2013.01); *F01D 5/189* (2013.01); *F01D 5/282* (2013.01); *F05D 2240/80* (2013.01); *F05D 2260/941* (2013.01); *F05D 2300/6033* (2013.01)

(58) Field of Classification Search
None
See application file for complete search history.

(56) References Cited

U.S. PATENT DOCUMENTS

| | | | |
|---|---|---|---|
| 5,129,783 A * | 7/1992 | Hayton | F01D 11/005 415/209.3 |
| 6,045,310 A | 4/2000 | Miller et al. | |
| 6,418,618 B1 * | 7/2002 | Burdgick | F01D 5/288 29/889 |
| 6,514,046 B1 | 2/2003 | Morrison et al. | |
| 6,543,993 B2 * | 4/2003 | Burdgick | F01D 25/12 415/116 |
| 6,884,030 B2 | 4/2005 | Darkins, Jr. et al. | |
| 7,052,234 B2 | 5/2006 | Wells et al. | |
| 7,452,189 B2 | 11/2008 | Shi et al. | |
| 8,292,580 B2 | 10/2012 | Schiavo et al. | |
| 9,546,557 B2 | 1/2017 | Grooms, III et al. | |
| 9,915,159 B2 | 3/2018 | Huizenga et al. | |
| 10,072,516 B2 | 9/2018 | Carr et al. | |
| 10,094,239 B2 | 10/2018 | Freeman et al. | |
| 10,273,818 B2 | 4/2019 | Vetters et al. | |
| 10,309,240 B2 | 6/2019 | Heitman et al. | |
| 10,392,945 B2 | 8/2019 | Dutta et al. | |
| 10,408,090 B2 | 9/2019 | Popheter-Hinckley | |
| 2010/0021290 A1 | 1/2010 | Schaff et al. | |
| 2016/0123163 A1 | 5/2016 | Freeman et al. | |
| 2016/0153299 A1 | 6/2016 | Tuertscher et al. | |
| 2016/0169033 A1 * | 6/2016 | Weaver | F01D 25/005 415/200 |
| 2016/0290147 A1 | 10/2016 | Weaver | |
| 2017/0260869 A1 * | 9/2017 | Vetters | F01D 11/08 |
| 2020/0080434 A1 * | 3/2020 | Thomas | F01D 5/282 |
| 2020/0340365 A1 * | 10/2020 | Whittle | F01D 11/001 |
| 2020/0362707 A1 * | 11/2020 | Whittle | F01D 5/284 |

* cited by examiner

*Primary Examiner* — Michael Lebentritt
(74) *Attorney, Agent, or Firm* — Barnes & Thornburg LLP (57) ABSTRACT

An airfoil assembly includes a vane that includes an outer platform, an inner platform, and an airfoil. The outer platform defines an outer boundary of a gas path. The inner platform is spaced apart axially from the outer platform relative to an axis and defines an inner boundary of the gas path. The airfoil extends axially between and interconnects the outer platform and the inner platform.

20 Claims, 4 Drawing Sheets

TURBINE VANE ASSEMBLY WITH CERAMIC MATRIX COMPOSITE COMPONENTS AND SLIDING SUPPORT

FIELD OF THE DISCLOSURE

The present disclosure relates generally to airfoil assemblies for gas turbine engines, and more specifically to airfoil assemblies that comprise ceramic containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils are often made from high-temperature resistant materials and/or are actively cooled by supplying relatively cool air to the vanes and blades due to the high temperatures of the combustion products. To this end, some airfoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

An airfoil assembly for a gas turbine engine may include a metallic support carrier, a ceramic matrix composite vane, and at least one expansion pad. The metallic support carrier may have a first coefficient of thermal expansion. The ceramic matrix composite vane may be adapted to interact with hot gases flowing through a gas path of the gas turbine engine during use of the airfoil assembly. The at least one expansion pad may be located between the support carrier and the vane.

In some embodiments, the expansion pad may have a second coefficient of thermal expansion. The second coefficient of thermal expansion may be greater than the first coefficient of thermal expansion so that the expansion pad is configured to grow away from the vane towards the support carrier and urge the vane mount into engagement with the support carrier during use of the airfoil assembly.

In some embodiments, the metallic support carrier may include a wall and a flange. The wall may extend radially at least partway about an axis. The flange may extend axially away from the wall.

In some embodiments, the flange may have a first portion and a second portion. The second portion may be spaced apart from the first portion to define a vane-receiver space there between.

In some embodiments, the ceramic matrix composite vane may include a first platform, a second platform, an airfoil, and a vane mount. The first platform may define a first boundary of the gas path. The second platform may be spaced apart axially from the first platform relative to the axis to define a second boundary of the gas path. The airfoil may extend axially between and interconnect the first platform and the second platform. The vane mount may extend axially away from the first platform and may be located in the vane-receiver space defined by the flange of the support carrier.

In some embodiments, the expansion pad is fixed to the vane mount. The expansion pad may directly engage the first portion of the flange and the vane mount.

In some embodiments, the expansion pad may include a first contact surface and a second contact surface. The first contact surface may engage the vane mount of the vane. The second contact surface may engage the first portion of the flange. In some embodiments, the second contact surface of the expansion pad may be angled relative to first contact surface of the expansion pad.

In some embodiments, the first portion of the flange may be shaped to include an extension tab. The extension tab may extend away from the first portion. In some embodiments, the expansion pad may engage the extension tab of the flange.

In some embodiments, the vane may have a leading edge, a trailing edge, a pressure side, and a suction side. In some embodiments, the expansion pad may be located between the pressure side of the vane mount and the first portion of the flange.

In some embodiments, the second portion of the flange may be formed to define at least one load pad. The load pad may extend away from the second portion of the flange and engage the suction side of the vane mount.

In some embodiments, the at least one load pad may have a third coefficient of thermal expansion. The third coefficient of thermal expansion may be greater than the first coefficient of thermal expansion.

In some embodiments, the airfoil assembly may further include three expansion pads. Each of the expansion pads may be located between one of the first portion and the second portion of the flange included in the support carrier and the vane mount included in the vane.

In some embodiments, vane has a leading edge, a trailing edge, a pressure side, and a suction side. The one expansion pad of the three expansion pads may be located between the pressure side of the vane mount and the first portion of the flange. The other two expansion pads may be located between the suction side of the vane mount and the second portion of the flange.

In some embodiments, each of the expansion pads may include a first contact surface and a second contact surface. The first contact surface may engage the vane mount of the vane. The second contact surface may engage the first portion of the flange. In some embodiments, the second contact surface of the expansion pad may be angled relative to first contact surface of the expansion pad.

According to another aspect of the present disclosure, an assembly for a gas turbine engine may include a first component, a second component, and at least one expansion pad. The first component may have a first coefficient of thermal expansion. The second component may be arranged adjacent to the first component. The at least one expansion pad may be located between the first component and the second component.

In some embodiments, the expansion pad may have a second coefficient of thermal expansion. The second coefficient of thermal expansion may be greater than the first coefficient of thermal expansion. In some embodiments, the expansion pad may be configured to grow relative to the first component and urge the second component away from the expansion pad.

In some embodiments, the expansion pad may be fixed to the second component and directly engage the first component. In some embodiments, the expansion pad may be fixed to the first component and directly engage the second component.

In some embodiments, the first component may include a wall and a flange. The wall may extend radially at least partway about an axis. The flange may extend axially away from the wall.

In some embodiments, the flange may have a first portion and a second portion. The second portion may be spaced apart from the first portion to define a receiver space there between. The receiver space may receive a portion of the second component.

In some embodiments, the expansion pad may include a first contact surface and a second contact surface. The first contact surface may engage the second component. The second contact surface may engage the first portion of the flange. In some embodiments, the second contact surface of the expansion pad may be angled relative to first contact surface of the expansion pad.

In some embodiments, the first component may include a wall and a spar. The wall may extend radially at least partway about an axis. The spar may extend axially inward from the wall through a cavity. The cavity may extend axially through the first component.

In some embodiments, the expansion pad may extend from the spar and engage the second component in the cavity. In some embodiments, the expansion pad may be fixed with the second component and engage the spar in the cavity.

In some embodiments, the second component may be shaped to define a first side and a second side. In some embodiments, the expansion pad may be located between the first side of the second component and the first portion of the flange.

In some embodiments, the flange may be formed to define at least one load pad. The at least one load pad may extend away from the flange and engage the second side of the second component.

In some embodiments, the at least one load pad may have a third coefficient of thermal expansion. The third coefficient of thermal expansion may be greater than the first coefficient of thermal expansion.

According to another aspect of the present disclosure, a method may include several steps. The method may include providing an assembly that includes a first component, a second component, and at least one expansion pad. The first component may have a first coefficient of thermal expansion. The second component may be arranged adjacent to the first component. The expansion pad may have a second coefficient of thermal expansion that is greater than the first coefficient of thermal expansion.

In some embodiments, the expansion pad may be located between the first component and the second component. In some embodiments, the method may further include heating the assembly to cause the expansion pad to grow relative to the first component and urge the second component into engagement with first component.

In some embodiments, the first component may include a wall and a flange. The flange may extend away from the wall.

In some embodiments, the flange may have a first portion and a second portion. The second portion may be spaced apart from the first portion to define a receiver space there between. The receiver spar may receive a portion of the second component. In some embodiments, the expansion pad may be fixed to the second component and may be directly engaged with the first portion of the flange.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
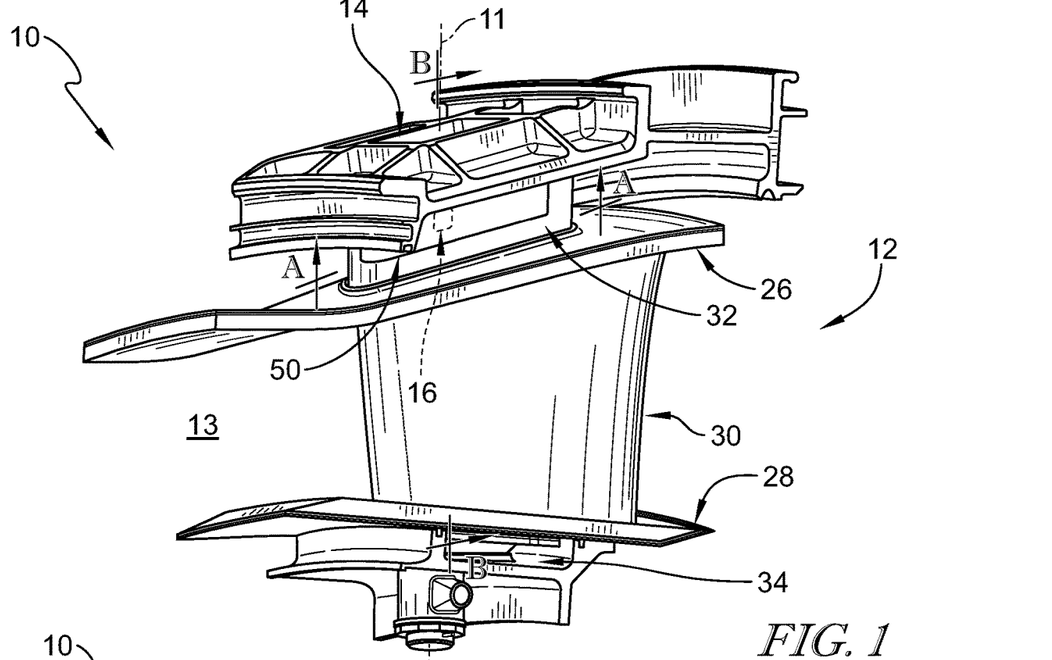
FIG. 1 is a perspective view of an airfoil assembly for a gas turbine engine that includes a ceramic matrix composite vane adapted to interact with hot gases flowing through a gas path of the gas turbine engine and a metallic vane support that extends axially through an interior cavity formed in the vane.
Figure 2:
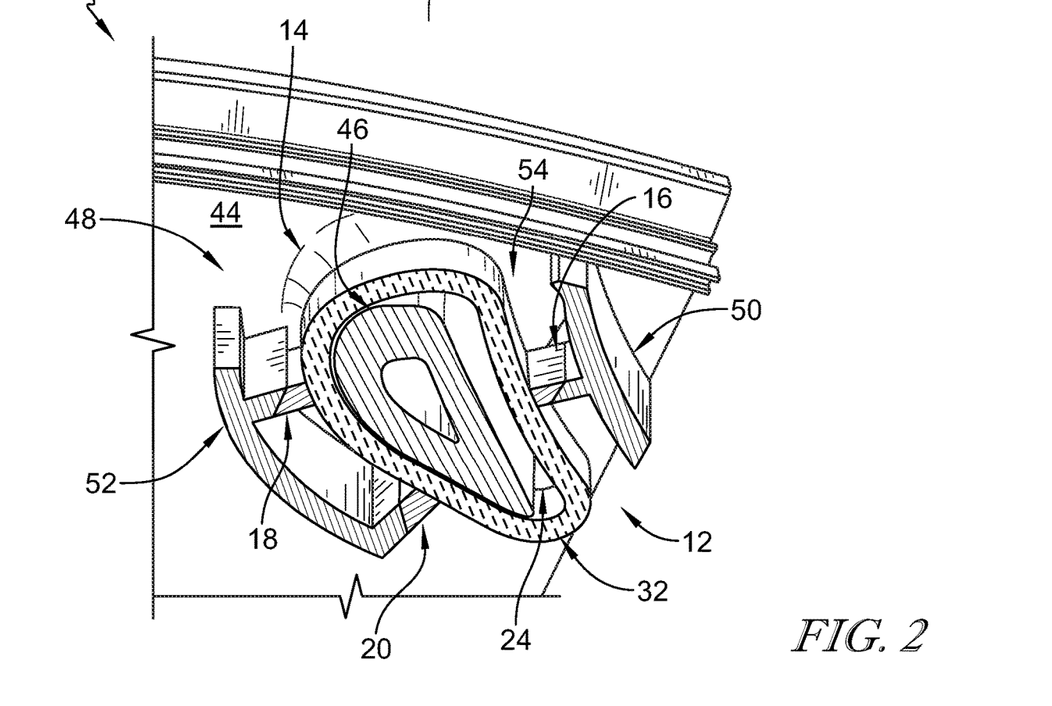
FIG. 2 is a perspective view of a sectioned portion of the airfoil assembly of FIG. 1 showing the airfoil assembly further includes expansion pads arranged between the support carrier and the turbine vane that have a coefficient of thermal expansion greater than that of the support carrier so that the expansion pads thermally grow away from the support carrier to urge the vane into maintaining engagement with support carrier during use of the airfoil assembly.

An airfoil assembly 10 according to the present disclosure and adapted for use in a gas turbine engine is shown in FIG. 1. The airfoil assembly 10 includes a vane 12, a support carrier 14, and at least one expansion pad 16 as shown in FIGS. 2-6. The vane 12 is adapted to interact with hot gases flowing through a gas path 13 of the gas turbine engine during use of the airfoil assembly 10. The support carrier 14 extends axially through an interior cavity 24 formed in the vane 12. The expansion pad 16 is arranged between a portion of the vane 12 and a portion of the support carrier 14 and is configured to thermally expand during use of the airfoil assembly 10 to maintain engagement of the vane 12 with the support carrier 14 so that loads acting on the vane 12 are transmitted to the support carrier 14. In the illustrative embodiment, the airfoil assembly includes at least three expansion pads 16, 18, 20 arranged around the vane 12 as shown in FIG. 2.

The vane 12 comprises ceramic matrix materials while the support carrier 14 and expansion pad 16 comprise metallic materials in the illustrative embodiment. The ceramic matrix composite vane 12 is adapted to withstand high temperatures, while the metallic support carrier 14 is adapted to support the vane 12 relative to an associated turbine case. The vane 12 is configured to shield the metallic materials of the support carrier 14 that may not be capable of withstanding such high temperatures experienced by the ceramic materials of the vane 12. However, the metallic support carrier 14 may have a coefficient of thermal expansion greater than that of the ceramic matrix composite vane 12, which may cause the metallic support carrier 14 to grow away from the ceramic matrix composite vane 12 and lose contact of the load-transfer features with the vane 12.

To combat this difference in thermal expansion, the metallic support carrier 14 has a first coefficient of thermal expansion, while the expansion pads 16, 18, 20 have a second coefficient of thermal expansion that is greater than the first coefficient of thermal expansion. In this way, the expansion pads 16, 18, 20 are configured to grow away from the vane outer mount 32 towards the support carrier 14 and urge the vane 12 into engagement with the support carrier 14 during use of the airfoil assembly 10.

The ceramic matrix composite vane 12 includes outer and inner platforms 26, 28, an airfoil 30, and outer and inner vane mounts 32, 34 as shown in FIGS. 2-6. The outer platform 26 defines a first boundary, or outer boundary of the gas path 13. The inner platform 28 is spaced apart axially from the outer platform 26 relative to an axis 11 to define a second boundary, or inner boundary of the gas path 13. The airfoil 30 extends axially between and interconnects the outer platform 26 and the inner platform 28. The outer vane mount 32 extends axially away from the outer platform 26, while the inner vane mount 34 extends axially away from the inner platform 28.

Figure 5:
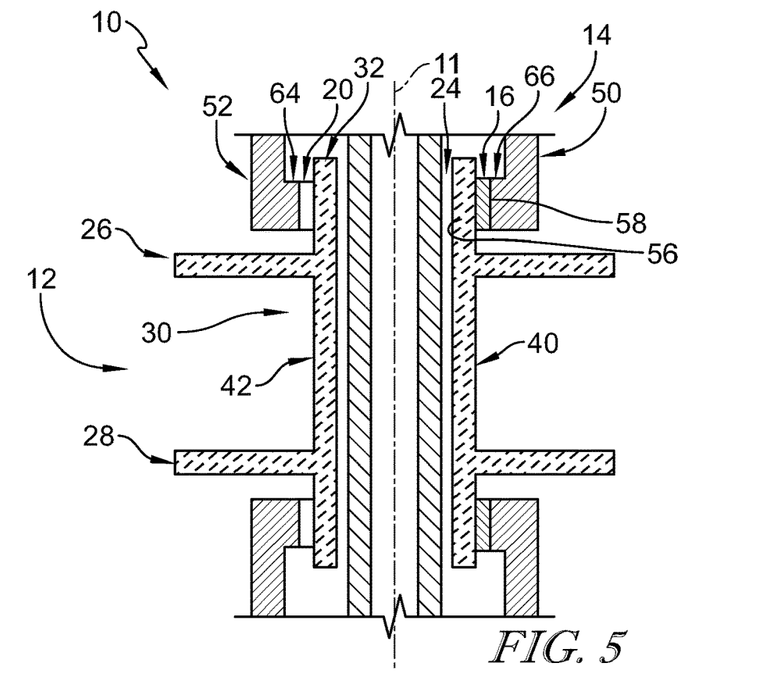
FIG. 5 is a cross-section view of the airfoil assembly of FIG. 1 taken along line B-B showing the turbine vane includes outer and inner platforms that define a gas path of the gas turbine engine, an airfoil that extends axially between the outer and inner platforms, and an outer mount that extends axially outward from the outer platform, and further showing the expansion pads at cold build are arranged between the flange and the outer mount of the vane axially outward of the gas path.
Figure 6:
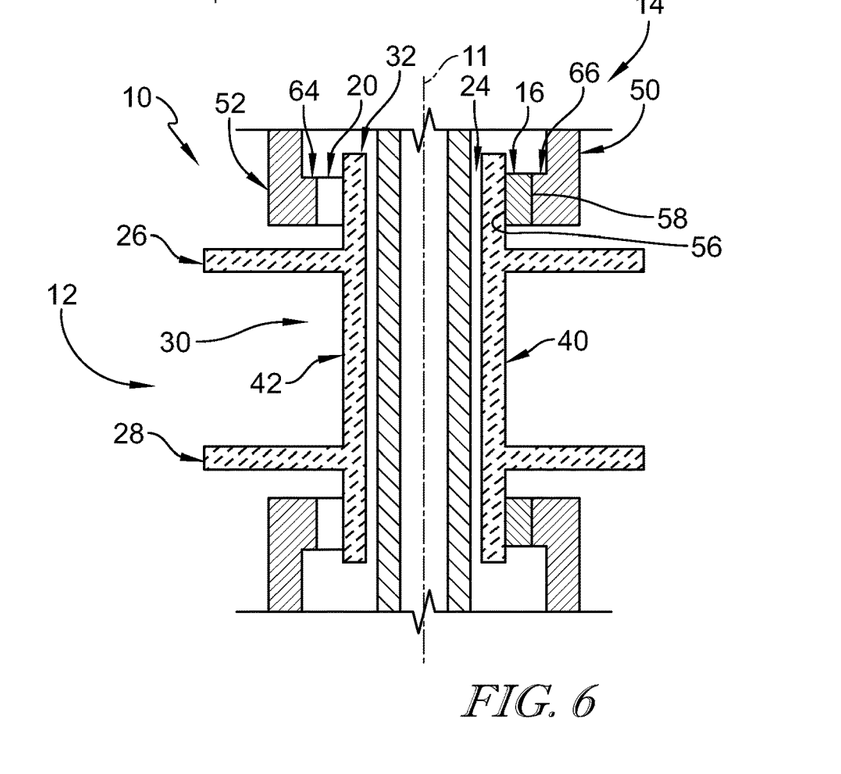
FIG. 6 is a view similar to FIG. 5 showing the first and second portions have grown away from the outer mount of the vane during use of the airfoil assembly in the gas turbine engine, and further showing the expansion pads have expanded in size to maintain engagement of the outer mount of the vane with the first and second portions of the flange.

The expansion pads 16, 18, 20 are described as being used with the outer vane mount 32 in the present disclosure. As shown in FIGS. 5 and 6, the expansion pad features may be used with the inner vane mount 34. The expansion pad features 18 may be used with one or both of the outer and inner vane mounts 32, 34.

The vane 12 also has a leading edge 36, a trailing edge 38, a pressure side 40, and a suction side 42 as shown in FIGS. 3-6. The trailing edge 38 is spaced radially apart from the leading edge 36 of the vane 12. The pressure side 40 is radially spaced apart from the suction side 42. The suction side 42 and pressure side 40 extend between and interconnect the leading edge 36 and the trailing edge 38.

The metallic support carrier 14 includes a wall 44, a metallic spar 46, and a flange 48 as shown in FIGS. 2-6. The wall 44 extends radially at least partway relative to the axis 11. The metallic spar 46 extends axially inward from the wall 44 through the interior cavity 24 of the vane 12. The flange 48 extends axially away from the wall 44.

Figure 3:
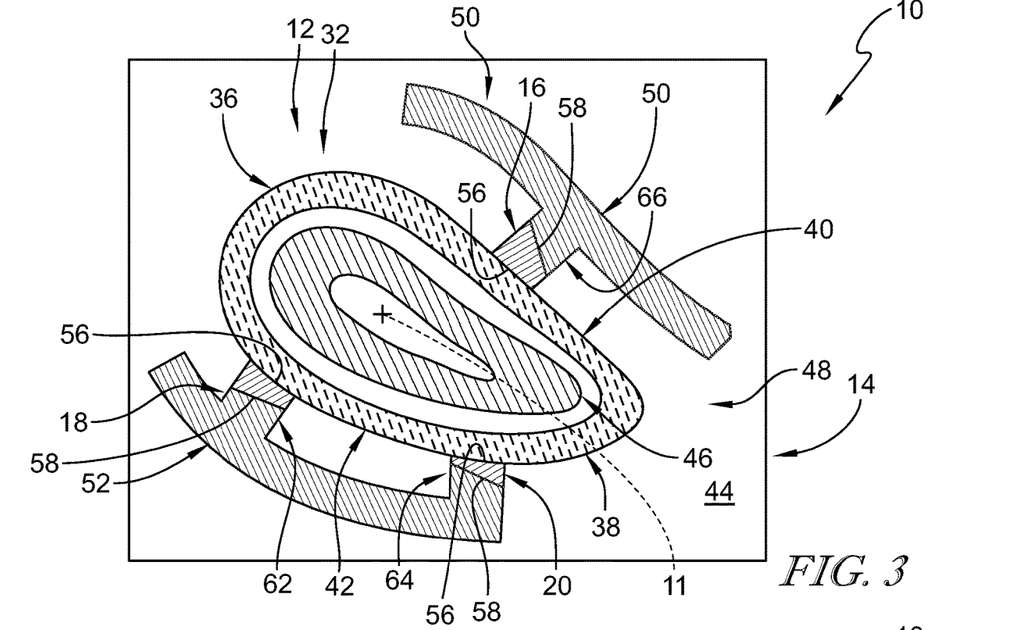
FIG. 3 is a cross-section view of the airfoil assembly of FIG. 1 taken along line A-A showing the support carrier includes a wall and a flange that extends axially inward from the wall, the flange having a first portion that extends around a portion of a pressure side of the vane and a second portion that extends around a portion of the suction side of the vane, and further showing the expansion pads at cold build are arranged between the flange and the vane on both the pressure and suction sides of the vane.
Figure 4:
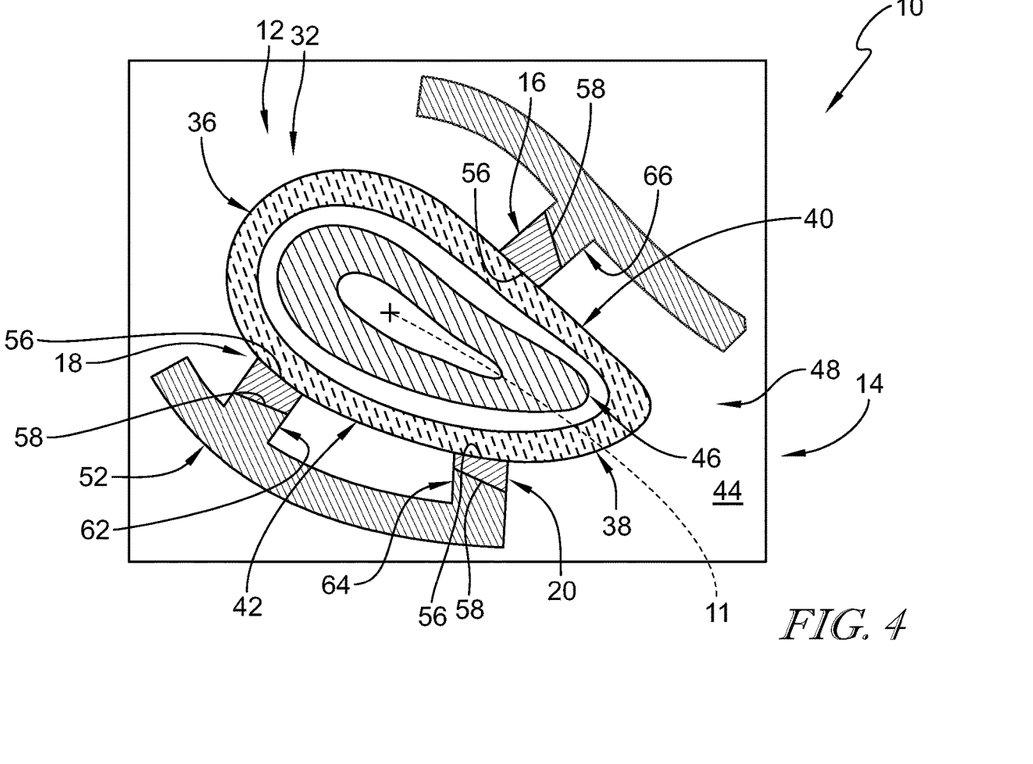
FIG. 4 is view similar to FIG. 3 showing the first and second portions of the flange have thermally grown away from the vane during use of the airfoil assembly in the gas turbine engine, and further showing the expansion pads have expanded in size to maintain engagement of the vane with the first and second portions so that force loads acting on the vane are transmitted to the support carrier.

The flange 48 includes a first portion 50 and a second portion 52 as shown in FIGS. 2-6. The first portion 50 extends around a portion of the pressure side 40 of the outer vane mount 32. The second portion 52 extends around a portion of the suction side 42 of the outer vane mount 32. In other embodiments, the flange 48 may be continuous so that the first and second portions 50, 52 are different portions of a single-piece, continuous looped flange 48. In the illustrative embodiment, the second portion 52 is spaced apart from the first portion 50 to define a vane-receiver space 54 therebetween as shown in FIGS. 2-4. The outer vane mount 32 is located in the vane-receiver space 54 defined by the flange 48 of the support carrier 14. In some embodiments, the flange 48 may be split into more than two portions 50, 52. In such embodiments, the flange 48 may include a separate portion for each expansion pad 16, 18, 20. In other embodiments, the flange 48 may include a plurality of segments or portions that extend radially inward from the wall 44 that each include an expansion pad 16, 18, 20 that engages the vane mount 32 of the vane 12.

In the illustrative embodiment, the first expansion pad 16 is located between the first portion 50 of the flange 48 included in the support carrier 14 and the outer vane mount 32 included in the vane 12 on the pressure side 40 of the outer vane mount 32. The second and third expansion pads 18, 20 are located between the second portion 52 of the flange 48 and the outer vane mount 32 on the suction side 42 of the vane 12. The three expansion pads 16, 18, 20 are configured to expand and maintain contact of the vane 12 with the flange 48. In other embodiments, the airfoil assembly 10 may include more than three expansion pads 16, 18, 20.

Each of the expansion pads 16, 18, 20 includes a first contact surface 56 and a second contact surface 58 as shown in FIGS. 3-6. The first contact surface 56 engages and interfaces the vane mount 32 of the vane 12. The second contact surface 58 engages and interfaces the flange 48 of the support carrier 14. In the illustrative embodiment, the second contact surface 58 is angled relative to the first contact surface 56.

The angled shape of the second contact surface 58 increases the surface area of the second contact surface 58 compared to the first contact surface 56. The increased surface area reduces the contact stresses and provides a large contact area between the vane mount 32 and the flange 48. In other embodiments, the contact surfaces follow a contour of the vane 12 or are generally linear and non-angled.

In the illustrative embodiment, the expansion pads 16, 18, 20 are sized to expand in the gap between the flange 48 and the vane mount 32 as the metallic support carrier 14 expands away from the ceramic matrix composite vane 12. The size and thickness of the expansion pads 16, 18, 20 are configured to survive the induced stresses and optimize relative movement of the expansion pads 16, 18, 20.

In the illustrative embodiment, the metallic spar 46 extends axially inward from the wall 44 between the first portion 50 and the second portion 52 of the flange 48. The vane-receiver space 54 is between the first and second portions 50, 52 of the flange 48 and the metallic spar 46 in the illustrative embodiment. In other embodiments, the first and second portions 50, 52 extend completely around the pressure and suction sides 40, 42 of the outer vane mount 32.

In other embodiments, the expansion pads 16, 18, 20 may be coupled to the spar 46 and engage the vane mount 32 in the cavity 24 of the vane 12. Each expansion pad 16, 18, 20 may be extend from the spar 46 and expand away from the spar to engage the vane mount 32. In such embodiments, the expansion pad 26 may extend from the spar 46 and engage the vane mount 32 on a pressure side 40 of the vane 12, while the other expansion pads 18, 20 extend from the spar 46 and engage the vane mount 32 on the suction side 42 of the vane 12.

In some embodiments, where only one expansion pad 16 is used, the expansion pad 16 may couple to the spar 46 and engage the vane mount 32 on the suction side 42 of the vane 12. The spar 46 may be formed to include load pads that engage the vane mount 32 in the interior cavity 24 on the pressure side 40 of the vane 12.

The second portion 52 of the flange 48 is formed to define a first extension tab 62 and a second extension tab 64 as shown in FIGS. 2-7. The first extension tab 62 extends away from the second portion 52 of the flange 48. The second extension tab 64 is spaced apart from the first extension tab 62 along the second portion 52 of the flange 48 and extends from the second portion 52 of the flange 48. In some embodiments where only one expansion pad 16 is used, the first extension tab 62 engages the suction side 42 of the outer vane mount 32 and the second extension tab 64 engages the suction side 42 of the outer vane mount 32 at a location spaced apart from the first extension tab 62.

In the illustrative embodiment, the second and third expansion pads 18, 20 are arranged between the extension tabs 62, 64 and the outer vane mount 32. The second expansion pad 18 is fixed to the outer vane mount 32 and extends between the extension tab 62 and the outer vane mount 32. The third expansion pad 20 is fixed to the outer vane mount 32 and extends between the extension tab 64 and the outer vane mount 32.

In other embodiments, the second expansion pad 18 may be fixed to the extension tab 62 and extends between the extension tab 62 and the outer vane mount 32. Additionally, in other embodiments, the third expansion pad 20 may be fixed to the extension tab 64 and extends between the extension tab 64 and the outer vane mount 32.

In the illustrative embodiment, the first portion 50 of the flange 48 includes a third extension tab 66 as shown in FIGS. 4 and 5. The third extension tab 66 extends away from the first portion 50 of the flange 48. The first expansion pad 16 is fixed to the outer vane mount 32 and extends between the extension tab 66 and the outer vane mount 32 on the pressure side 40. In other embodiments, the first expansion tab 16 may be fixed to the extension tab 66 and extend between the extension tab 66 and the outer vane mount 32 on the pressure side 40.

A method of assembling and using the airfoil assembly 10 in the gas turbine engine may include several steps. The method includes arranging the support spar 46 through the interior cavity 24 to locate the outer vane mount 32 within the vane-receiver space 54 and heating the airfoil assembly 10 to cause the expansion pads 16, 18, 20 to grow relative to the flange 48 and maintain engagement of the vane 12 with the flange 48.

Figure 7:
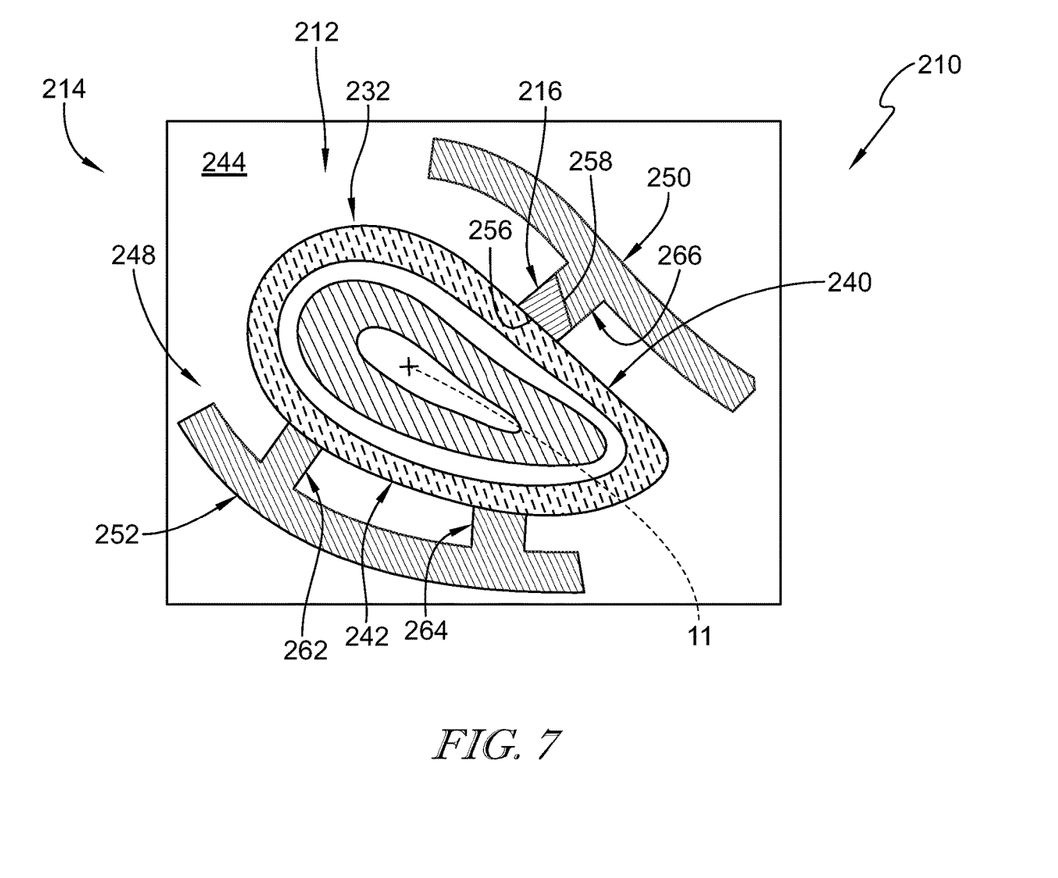
FIG. 7 is cross-section view of another embodiment of an airfoil assembly showing the airfoil assembly includes a vane, a support carrier, and one expansion pad arranged between the support carrier and the vane on a pressure side of the vane that has a coefficient of thermal expansion greater than that of the support carrier to urge the vane into engagement with load pads included in the support carrier on a suction side of the vane during use of the airfoil assembly.

Another embodiment of an airfoil assembly 210 in accordance with the present disclosure is shown in FIG. 7. The airfoil assembly 210 is substantially similar to the airfoil assembly 10 shown in FIGS. 1-6 and described herein. Accordingly, similar reference numbers in the 200 series indicate features that are common between the airfoil assembly 10 and the airfoil assembly 210. The description of the airfoil assembly 10 is incorporated by reference to apply to the airfoil assembly 210, except in instances when it conflicts with the specific description and the drawings of the airfoil assembly 210.

The airfoil assembly 210 includes a vane 212, a support carrier 214, and one expansion pad 216 as shown in FIG. 7. The expansion pad 216 is arranged between a portion of the vane 212 and a portion of the support carrier 214 and is configured to thermally expand during use of the airfoil assembly 210 to maintain engagement of the vane 212 with the support carrier 214.

The metallic support carrier 214 includes a wall 244 and a flange 248 as shown in FIG. 7. The wall 244 extends radially at least partway relative to the axis 11. The flange 248 extends axially away from the wall 244. In the illustrative embodiment, the flange 248 has a first portion 250 that extends around a portion of a pressure side 240 of an outer vane mount 232 of the vane 212 and a second portion 252 extends around a portion of a suction side 242 of the outer vane mount 232.

The second portion 252 of the flange 248 is formed to define a first load pad 262 and a second load pad 264 as shown in FIG. 7. The first load pad 262 extends away from the second portion 252 of the flange 248. The second load pad 264 is spaced apart from the first load pad 262 along the second portion 252 of the flange 248 and extends from the second portion 252 of the flange 248. In the illustrative embodiment, the first load pad 262 engages the suction side 242 of the outer vane mount 232 and the second load pad 264 engages the suction side 242 of the outer vane mount 232 at a location spaced apart from the first load pad 262. In other embodiments, the expansion pad 216 is located on the suction side 242.

In the illustrative embodiment, the expansion pad 216 is located between the first portion 250 of the flange 248 included in the support carrier 214 and the outer vane mount 232 included in the vane 212 on the pressure side 240 of the outer vane mount 232. The expansion pad 216 is configured to expand and maintain contact of the vane 212 with the extension tab 266 on the first portion 250 of the flange 248. In turn, the vane mount 232 also maintain in contact with the load pads 262, 264 on the second portion 252 of the flange 248.

The expansion pad 216 includes a first contact surface 256 and a second contact surface 258 as shown in FIG. 7. The first contact surface 256 engages and interfaces the vane mount 232 of the vane 212. The second contact surface 258 engages and interfaces the flange 248 of the support carrier 214. In the illustrative embodiment, the second contact surface 258 is angled relative to the first contact surface 256. In other embodiments, the contact surface 258 is not angled.

The present disclosure relates to managing the relative thermal growth mismatch between a ceramic matrix composite vane 12, 212 and a metallic support structure 14, 214 using compliance through appropriately shaped expansion pads 16, 18, 20, 216. In some embodiments, the load from the turbine vane 12, 212 is transmitted outboard to the high-pressure turbine casing. In metallic vane embodiments, the vane may be supported on hooks and/or rails attached to the outer platform of the vane. However, such an attachment arrangement may be a challenge for strain-limited structures manufactured from SiC/SiC ceramic matrix composite materials.

In some embodiments, to transfer the aerodynamic loading applied to the ceramic matrix composite vane, the load is transmitted at both the inner and outer extents of the vane through a metallic structure or spar out into the casing. However, the ceramic matrix composite material may have a significantly lower coefficient of thermal expansion compared to the high temperature metallic material of the support structure. This difference in thermal expansion may result in a significant mismatch in radial height and circumference between cold build and the hottest operating conditions.

The present disclosure provides an airfoil assembly 10, 210 that includes a metallic support carrier 14, 214 to transfer the aerodynamic loading imparted on the ceramic matrix composite vane 12, 212. In the illustrative embodiments, the aerodynamic load may be transferred through two joints, one at the outer annulus (i.e. the outer vane mount 32, 232) and the other at the inner annulus (i.e. the inner vane mount 34, 234). In other embodiments, only one joint (inner or outer) may be used.

In the illustrative embodiments, the airfoil assembly 10 includes a plurality of expansion pads 16, 18, 20 that transfer the aerodynamic loading imparted on the vane 12, whilst allowing the thermal expansion of the metallic support carrier 14. The expansion pads 16, 18, 20 ensure the contact between the vane 12 and the support carrier 14 is maintained at all parts of the flight/engine operating cycle.

In the illustrative embodiment of FIGS. 3-6, the expansion pads 18, 20 on the suction side 42 of the vane 12 sit on either side of the resultant aerodynamic load vector. In the illustrative embodiment of FIG. 7, the load pads 262, 264 on the suction side 242 that sit either side of the resultant aerodynamic load vector. The precise locations may be optimized to equally share loading at each expansion pad 18, 20, 216.

In the illustrative embodiments, the expansion pad 16, 216 located on the pressure side 40, 240 may block rotation of the vane 12, 212 and maintain stability of the airfoil assembly 10, 210. The location of the expansion pad 16, 216 may be chosen such that the expansion pad 16, 216 is always on the same side of the aerodynamic lift vector throughout the engine running range. In this way, there may be no unloading or reversal of loading when the pressure distribution varies.

In the illustrative embodiment, the expansion pads 16, 18, 20 are configured to transfer the load through the outer surface of the vane 12 to the metallic support carrier 14. The spar 46 of the support carrier 14 extends through the interior cavity 24 of the vane 12 then provides a vane-receiver space 54 for the vane 12 to sit in. The expansion pads 16, 18, 20 are located between the flange 48 and ceramic matrix composite vane 12 and have a tailored coefficient of thermal expansion (CTE). The tailored CTE allows the pads 16, 18, 20 to expand the same amount as the flange 48 even though their dimensions are smaller. This ensures contact is maintained at all operating conditions.

In the illustrative embodiment, each expansion pad 16, 18, 20, 216 contact the flange 48, 248 at an angled surface. The angled contact 58, 258 may be optimized depending on design conditions.

In the illustrative embodiments, each expansion pad 16, 18, 20 interface an extension tab 62, 64, 66 of the flange 48 made of a material with a tailored CTE. A slanted contact surface 58 between the pads 16, 18, 20 and the tabs 62, 64, 66 may be used to ensure the largest contact area possible and reduce contact stresses on the components.

As the system heats up, the metal expands away from the ceramic matrix composite material. The tailored CTE of the expansion pads 16, 18, 20, 216 causes the expansion pads 16, 18, 20, 216 to expand so that although there is less material the overall expansion distance is the same. This means that the metal will expand away from the ceramic, but the tailored expansion pads 16, 18, 20 expand to fill the gaps created and ensure contact is maintained during the different flight cycles and engine operating points.

In some embodiments, the size and thickness of the expansion pads 16, 18, 20, 216 may be selected such that the pads 16, 18, 20, 216 may survive the induced stresses. The exact form and dimensions of the metallic expansion pads 16, 18, 20, 216 may be chosen in order to minimize stress in the system and optimize relative movement of the expansion pad 16, 18, 20, 216. More than three expansion pad 16, 18, 20 may be used to minimize the stress in the flange 48.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for a gas turbine engine, the airfoil assembly comprising
   a metallic support carrier including a wall that extends radially at least partway about an axis and a flange that extends axially away from the wall, the flange having a first portion and a second portion spaced apart from the first portion to define a vane-receiver space there between, and the metallic support carrier having a first coefficient of thermal expansion,
   a ceramic matrix composite vane adapted to interact with hot gases flowing through a gas path of the gas turbine engine during use of the airfoil assembly, the ceramic matrix composite vane including a first platform that defines a first boundary of the gas path, a second platform spaced apart axially from the first platform relative to the axis to define a second boundary of the gas path, an airfoil that extends axially between and interconnects the first platform and the second platform, and a vane mount that extends axially away from the first platform and located in the vane-receiver space defined by the flange of the support carrier, and
   at least one expansion pad located between the first portion of the flange included in the support carrier and the vane mount included in the vane, the expansion pad having a second coefficient of thermal expansion that is greater than the first coefficient of thermal expansion so that the expansion pad is configured to grow away from the vane mount towards the first portion of the flange and urge the vane mount into engagement with the second portion of the flange during use of the airfoil assembly.

2. The airfoil assembly of claim 1, wherein the expansion pad is fixed to the vane mount and directly engages the first portion of the flange and the vane mount.

3. The airfoil assembly of claim 2, wherein the expansion pad includes a first contact surface that engages the vane mount of the vane and a second contact surface that engages the first portion of the flange, and wherein the second contact surface of the expansion pad is angled relative to first contact surface of the expansion pad.

4. The airfoil assembly of claim 3, wherein the first portion of the flange is shaped to include an extension tab that extends away from the first portion and the expansion pad engages the extension tab of the flange.

5. The airfoil assembly of claim 1, wherein the vane has a leading edge, a trailing edge, a pressure side, and a suction side and the expansion pad is located between the pressure side of the vane mount and the first portion of the flange.

6. The airfoil assembly of claim 5, wherein the second portion of the flange is formed to define at least one load pad that extends away from the second portion of the flange and engages the suction side of the vane mount.

7. The airfoil assembly of claim 6, wherein the at least one load pad has a third coefficient of thermal expansion that is greater than the first coefficient of thermal expansion.

8. The airfoil assembly of claim 1, wherein the airfoil assembly includes three expansion pads each located between one of the first portion and the second portion of the flange included in the support carrier and the vane mount included in the vane.

9. The airfoil assembly of claim 8, wherein the vane has a leading edge, a trailing edge, a pressure side, and a suction side and one expansion pad of the three expansion pads is located between the pressure side of the vane mount and the first portion of the flange and the other two expansion pads are located between the suction side of the vane mount and the second portion of the flange.

10. The airfoil assembly of claim 9, wherein each of the expansion pads includes a first contact surface that engages the vane mount of the vane and a second contact surface that engages the first portion of the flange, and wherein the second contact surface of the expansion pad is angled relative to first contact surface of the expansion pad.

11. An assembly for a gas turbine engine, the airfoil assembly comprising
a first component having a first coefficient of thermal expansion,
a second component arranged adjacent to the first component, and
at least one expansion pad located between the first component and the second component, the expansion pad having a second coefficient of thermal expansion that is greater than the first coefficient of thermal expansion, and the expansion pad being configured to grow relative to the first component and urge the second component away from the expansion pad.

12. The assembly of claim 11, wherein the expansion pad is fixed to the second component and directly engages the first component.

13. The assembly of claim 12, wherein the first component includes a wall that extends radially at least partway about an axis and a flange that extends axially away from the wall, the flange having a first portion and a second portion spaced apart from the first portion to define a receiver space there between to receive a portion of the second component.

14. The assembly of claim 10, wherein the expansion pad includes a first contact surface that engages the second component and a second contact surface that engages the first portion of the flange, and wherein the second contact surface of the expansion pad is angled relative to first contact surface of the expansion pad.

15. The assembly of claim 12, wherein the first component includes a wall that extends radially at least partway about an axis and a spar that extends axially inward from the wall through a cavity that extends axially through the first component, and wherein the expansion pad is extends from the spar and engages the second component in the cavity.

16. The assembly of claim 11, wherein the second component is shaped to define a first side and a second side and the expansion pad is located between the first side of the second component and the first portion of the flange.

17. The assembly of claim 16, wherein the flange is formed to define at least one load pad that extends away from the flange and engages the second side of the second component.

18. The assembly of claim 17, wherein the at least one load pad has a third coefficient of thermal expansion that is greater than the first coefficient of thermal expansion.

19. A method comprising
providing an assembly that includes a first component having a first coefficient of thermal expansion, a second component arranged adjacent to the first component, and an expansion pad having a second coefficient of thermal expansion that is greater than the first coefficient of thermal expansion, and the expansion pad located between the first component and the second component, and
heating the assembly to cause the expansion pad to grow relative to the first component and urge the second component into engagement with first component.

20. The method of claim 19, wherein the first component includes a wall that and a flange that extends away from the wall, the flange having a first portion and a second portion spaced apart from the first portion to define a receiver space there between to receive a portion of the second component, and wherein the expansion pad is fixed to the second component and directly engaged with the first portion of the flange.

* * * * *